United States Patent [19]

Deckers et al.

[11] Patent Number: 5,473,025
[45] Date of Patent: Dec. 5, 1995

[54] PREPARATION OF CARBOXYL-CONTAINING COPOLYMERS OF ETHYLENE

[75] Inventors: Andreas Deckers, Flomborn; Rüger Schlund, Ludwigshafen; Roger Klimesch, Alsbach-Hähnlein, all of Germany

[73] Assignee: BASF Aktiengesellschaft, Ludwigshafen, Germany

[21] Appl. No.: 314,772

[22] Filed: Sep. 29, 1994

[30] Foreign Application Priority Data

Oct. 13, 1993 [DE] Germany ............ 43 34 846.7

[51] Int. Cl.⁶ ........................................ C08F 8/00
[52] U.S. Cl. .................... 525/353; 525/329.5; 525/330.4
[58] Field of Search .................................. 525/353

[56] References Cited

U.S. PATENT DOCUMENTS

| 3,132,120 | 5/1964 | Graham . | |
|---|---|---|---|
| 3,736,305 | 5/1973 | Kinkel et al. . | |
| 4,638,034 | 1/1987 | McClain | 525/369 |

FOREIGN PATENT DOCUMENTS

| 2567894 | 1/1986 | France . |
|---|---|---|
| 1720335 | 3/1974 | Germany . |
| 107938 | 8/1974 | Germany . |
| 2400978 | 7/1975 | Germany . |
| 2937239 | 3/1981 | Germany . |
| 3525559 | 1/1986 | Germany . |
| 1213580 | 11/1970 | United Kingdom . |
| 2058795 | 4/1981 | United Kingdom . |
| 2065667 | 7/1981 | United Kingdom . |

OTHER PUBLICATIONS

Chem. Abst., vol. 82, No. 22, Jun. 2, 1975 (English abstract of DE 107 938).

Primary Examiner—Bernard Lipman
Attorney, Agent, or Firm—Keil & Weinkauf

[57] ABSTRACT

Carboxyl-containing copolymers of ethylene are prepared by polymer-analogous pyrolytic ester cleavage of copolymers consisting of
a) from 60 to 99.9 mol% of ethylene,
b) from 0.1 to 40 mol% of $C_4$–$C_8$-tert-alkyl esters of copolymerizable $C_3$–$C_{12}$-carboxylic acids and
c) from 0 to 20 mol% of further copolymerizable monomers by a method in which pyrolytic ester cleavage is carried out at from 150° to 250° C. in the presence of organic sulfonic acids, in the absence of a solvent and in the virtual absence of free radical initiators.

4 Claims, No Drawings

PREPARATION OF CARBOXYL-CONTAINING COPOLYMERS OF ETHYLENE

The present invention relates to an improved process for the prepeparation of carboxyl-containing copolymers of ethylene by polymer-analogous pyrolyric ester cleavage of copolymers consisting of a) from 1 to 99.9 mol% of ethylene, b) from 0.1 to 40 mol% of C4–C8-tert-alkyl esters of copolymerizable $C_3$–$C_{12}$-carboxylic acids and c) from 0 to 20 mol% of further copolymerizable monomers.

There are various known processes for the preparation of carbox-yl-containing copolymers of ethylene which are referred to below as polycarboxylic acids for short.

These polycarboxylic acids can be obtained directly by polymerizing a mixture of ethylene and unsaturated carboxylic acids at high pressures and temperatures (cf. for example DE-A 2 400 978 and DE-A 1 669 685). Disadvantages of this process are the high corrosion to which parts of the plant are exposed and the discoloration of the products.

U.S. Pat. No. -A 3,132,120 discloses the preparation of a tert-butoxycarbon-yl-containing copolymer from ethylene and a tert-butyl ester of an ethylenically unsaturated carboxylic acid by free radical polymerization and the conversion of said copolymer into the polycarboxylic acid in a polymer-analogous reaction in a second process step by pyrolytic ester cleavage at from 275° to 350° C. in the absence of oxygen.

DE-A 1 720 335 describes a process in which mixtures of ethylene and $C_3$–$C_{12}$-alkenecarboxylic acids which have been esterified with secondary $C_3$–$C_8$-alcohols or tertiary $C_4$–$C_8$-alcohols are polymerized in the presence of organic sulfonic acids and free radical initiators at from 110° to 350° C. and from 100 to 8000 bar, the protective groups being simultaneously eliminated and the polycarboxylic acids being directly obtained.

However, the quality of the polycarboxylic acids obtainable by these processes is inadequate for certain applications, such as the production of adhesives and films, because the products contain gel particles and specks.

Improved products can be prepared by the process described in DE-A 2 937 239, by suspending copolymers which contain ethylene and a $C_3$–$C_{12}$-alkenecarboxylic acid esterified with a secondary $C_3$–$C_8$-alcohol or tertiary $C_4$–$C_8$-alcohol in a solvent and cleaving the ester groups at from 40° to 75° C. in the presence of acidic catalysts, such as sulfuric acid or organic sulfonic acids. In this process, however, large amounts of contaminated solvents are obtained and have to be worked up by an expensive procedure and disposed-of.

It is an object of the present invention to provide a process for the preparation of polycarboxylic acids which does not have the stated disadvantages.

We have found that this object is achieved by a process for the preparation of carboxyl-containing copolymers of ethylene by polymer-analogous pyrolytic ester cleavage of copolymers consisting of a) from 60 to 99.9 mol% of ethylene, b) from 0.1 to 40 mol% of $C_4$–$C_8$-tert-alkyl esters of copolymerizable $C_3$–$C_{12}$-carboxylic acids and c) from 0 to 20 mol% of further copolymerizable monomers, wherein the pyrolytic ester cleavage is carried out at from 150° to 250° C. in the presence of organic sulfonic acids, in the absence of a solvent and in the virtual absence of free radical initiators.

tert-Alkoxycarbonyl-containing copolymers of ethylene, which are disclosed, for example, in DE-A 2 937 239, may be used as starting materials for the preparation of the polycarboxylic acids by the novel process.

They are preferably composed of a) from 60 to 99.9, preferably from 90 to 99.9, particularly from 95 to 99.9, mol% of ethylene, b) from 0.1 to 40, preferably from 0.1 to 10, particularly from 0.1 to 2.5, mol% of $C_4$–$C_8$-tert-alkyl esters of copolymerizable unsaturated $C_3$–$C_{12}$-carboxylic acids and c) from 0 to 20, preferably from 0 to 9.9, particularly from 0 to 2.5, mol% of further copolymerizable monomers.

The esters (b) are preferably derived from crotonic acid, isocrotonic acid, vinylacetic acid and particularly from acrylic acid and methacrylic acid, Secondly, esters of unsaturated polybasic carboxylic acids, such as maleic acid, fumaric acid and norbor-nene-2,3-dicarboxylic acid, are also suitable.

These acids are esterified with tertiary monohydric alcohols of 4 to 8 carbon atoms. Examples of suitable alcohols are tert-butyl alcohol and tert-amyl alcohol.

Particularly preferred esters are tert-butyl acrylate and methacrylate.

Further copolymerizable monomers (c) are in general those which can be copolymerized with ethylene. Hydrocarbons having C=C double bonds, such as $C_3$–$C_{10}$-alkenes, for example propene, butenes, pentenes and hexenes, the alk-1-enes being preferred, cycloalkenes, such as cyclopentenes, cyclohexenes and norbornenes, styrene and copolymerizable styrene derivatives, such as α-methylstyrene, as well as esters which are composed of the abovementioned unsaturated carboxylic acids and secondary alcohols of 3 to 10 carbon atoms, in particular isopropyl alcohol, and primary alcohols of 1 to 10 carbon atoms, and further functional derivatives of the abovementioned unsaturated carboxylic acids, for example amides, anhydrides and nitriles, are suitable.

In addition to compounds having C=C double bonds, other copolymerizable substances, such as carbon monoxide and sulfur dioxide, may also be used as comonomers (c).

The use of alkenecarboxylic acids whose esters are employed as component (b) is less preferable as comonomers (c) but in principle also possible.

The tert-alkoxycarbonyl-containing copolymers may also contain carboxyl groups when no alkenecarboxylic acids are used as monomers, since some of the ester groups can be cleaved under the polymerization conditions. The amount of carboxyl groups in the polymer-is in general not important with regard to carrying out the novel process.

The polymerization can usually be carried out by methods which are generally used for the preparation of low density polyethylene (cf. Ullmanns Encyclopedie der technischen Chemie, Volume 19, 4th Edition, pages 169–175). It is advantageously carried out in autoclaves or tube reactors at from 110° to 350° C. and from 100 to 8000 bar.

Suitable polymerization initiators are all those which are capable of initiating a free radical polymerization, for example azo compounds, such as azobisisobutyronitrile and derivatives, peroxides, eg. tert-butyl perbenzoate, di-tert-butyl peroxide and dilauroyl peroxide, and preferably oxygen. These substances are used in amounts of from 2 to 200 mol ppm, based on the ethylene to be polymerized.

The polymerization is preferably carried out by the mass-precipitation polymerization method, but it is also possible to use solvents which additionally act as molecular weight regulators, such as alcohols, eg. methanol and ethanol, ethers, eg. diethyl ether, ketones, eg. acetone and butanone, and aliphatic hydrocarbons. The molecular weight may also be regulated with hydrogen.

In the novel pyrolysis process, the tert-alkoxycarbonyl-containing copolymers of ethylene are cleaved into the polycarboxylic acids and the alkenes in a polymer-analogous reaction.

Organic sulfonic acids are added to the copolymer as pyrolysis catalysts. Aliphatic, aromatic and araliphatic mono-or polysulfonic acids, usually of 1 to 20 carbon atoms, are generally suitable for this purpose. The sulfonic acids may furthermore carry radicals, such as nitro or halogen. Examples are methanesulfonic acid, ethanesulfonic acid, p-toluenesulfonic acid, naphthalenesulfonic acid, m-benzenedisulfonic acid, benzene-1,3,5-trisulfonic acid, p-bromosulfonic acid and trifluoromethanesulfonic acid.

The molar ratio of the organic sulfonic acids, based on the tertalkoxycarbonyl groups, should be from 0.0001 : 1 to 1 : 1, preferably from 0.001 : 1 to 0.01 : 1.

The pyrolytic ester cleavage in general requires temperatures of from 150° to 250° C., preferably from 180° to 220° C., and usually reaction times of from 0.5 to 10, preferably from 0.5 to 5, minutes.

In order to achieve complete conversion in the polymer-analogous ester cleavage, relatively long reaction times should be chosen within the stated time interval if a relatively low temperature is chosen within the stated temperature range. Similarly, relatively short reaction times can be compensated by relatively high reaction temperatures. Reaction times of from 0.5 to 1 minute are particularly preferably combined with reaction temperatures of from 200° to 220° C.

The novel pyrolytic ester cleavage should be carried out in the virtual absence of the compounds used for initiating the polymerization and other free radical initiators. The content of such compounds in the copolymer is advantageously less than 1, preferably less than 0.5, mol ppm. Even where from 0.5 to 1 mol ppm of initiators are present, products of satisfactory quality are still obtained.

Any residues of the initiators added in the polymerization step which remain in the polymer can generally, however, be readily removed or destroyed by conventional methods, for example by heating the polymer to the desired pyrolysis temperature before the addition of the organic sulfonic acid in the absence of oxygen.

The novel pyrolytic ester cleavage is carried out in the absence of a solvent. The reaction conditions can be particularly advantageously maintained in an extruder. This is preferably a twinscrew extruder, in which the alkene being formed can emerge through devolatilization orifices. If necessary, the sulfonic acid can be removed from the polymer after the reaction is complete by additionally feeding in steam.

The novel pyrolysis process permits virtually complete polymeranalogous ester cleavage of the tert-alkoxycarbonyl-containing copolymers under milder conditions than in the prior art. Thus, secondary reactions which lead to changes in the polymer main chain and are promoted in particular by high temperatures or the presence of free radical initiators can be avoided. The formation of color-imparting components and gel-like products is substantially prevented, with the result that virtually speck-free and colorless polycarboxylic acids are obtained.

It has not been possible to date to prepare such polycarboxylic acids by processes in which all process steps can be carried out in the absence of a solvent; instead, they require the use of solvents, which subsequently had to be removed from the product and either purified or disposed of.

The products prepared by the novel process can be processed to films and are used as adhesives or powder coating materials.

Examples

Preparation of the alkoxycarbonyl-containing copolymers of ethylene

Polymer A

A mixture of 98.6 parts by weight of ethylene, 0.65 part by weight of tert-butyl acrylate and 0.75 part by weight of isobutene was polymerized continuously in a tube reactor at 280° C. and 2400 bar in the presence of 31 mol ppm, based on the ethylene used, of oxygen. The polymer obtained was composed of 96.6 mol% of ethylene, 1.7 mol% of tert-butyl acrylate and 1.7 mol% of acrylic acid.

Polymer B

The polymerization conditions chosen for the preparation of polymer A were modified so that the polymerization temperature was 220° C.

Polymer-analogous ester cleavage of the tert-alkoxycarbonylcarrying copolymers of ethylene The process parameters of Examples 1 to 3, 4V and 5V are shown in the table.

Examples 1 to 3 (according to the invention)

Polymer A or B was melted and then was extruded together with the sulfonic acid in a two-screw extruder (Model ZSK-30 from Werner & Pfleiderer) and the extrudate was granulated. The average residence time of the polymer in the extruder was 5 minutes.

Example 4V (Comparative Experiment)

This experiment differed from Examples 1 to 3 in that no sulfonic acid was added during the extrusion.

Copolymerization of ethylene with unsaturated tert-alkylcarboxylates and ester cleavage in one step Example--5V (Comparative Experiment, polymer C)

The experiment was carried out according to the preparation method for polymer A, but 0.5% by weight, based on the monomers, of p-toluenesulfonic acid (TSA) was added to the monomer mixture.

The polymer was then extruded as described in Examples 1 to 3, but without also adding sulfonic acid.

Testing of the polymer properties

The acrylic acid content was determined by IR spectroscopy, by quantitative evaluation of the band at 940 cm$^{-1}$. The total amount of carboxyl groups contained in the polymer (acid content, stated in mol%) relates to the total amount of the carboxyl and tertalkoxycarbonyl groups contained in the copolymer.

The melt flow index (MFI) serves as a guide to the flow behavior in processing methods at relative high shear rate, such as injection molding and extrusion. A molten sample is forced at 190° C. and under a load of 2.16 kg through the nozzle of a melt flow index tester according to DIN 53 735. The MFI is stated in g/10 min and corresponds to the mass of the melt strand which is forced through the nozzle in 10 min.

The polymers were tested with regard to their suitability for the production of films. For this purpose, samples of the polymers were heated to 150° C. in the extruder and 40 μm thick films were blown from the melt. The quality of the films was assessed visually with regard to their speck content and was rated. The rating scale extends from 1 (no specks) to 5 (very many specks).

The test results are summarized in the table.

TABLE

| Example | 1 | 2 | 3 | 4V | 5V |
|---|---|---|---|---|---|
| Polymer | A | A | B | A | C |
| Sulfonic acid | MSA | TSA | TSA | — | — |
| Amount of sulfonic acid [% by weight] | 1.4 | 0.5 | 0.5 | | |
| Extrusion temperature [°C.] | 200 | 200 | 200 | 200 | 200 |
| Acid content [mol-%] | 100 | 100 | 100 | 70 | 100 |
| MFI [g/10 min.] | 6.8 | 6.8 | 7.2 | 3.0 | 3.5 |
| Speck content | 2–3 | 2–3 | 2–3 | 4 | 4 |

MSA = Methanesulfonic acid
TSA = p-Toluenesulfonic acid

We claim:
1. A process for the preparation of carboxyl-containing copolymers of ethylene by polymer-analogous pyrolytic ester cleavage of copolymers consisting of
   a) from 60 to 99.9 mol% of ethylene,
   b) from 0.1 to 40 mol% of $C_4$–$C_8$-tert-alkyl esters of copolymerizable $C_3$–$C_{12}$-carboxylic acids and
   c) from 0 to 20 mol% of further copolymerizable monomers,
   wherein the pyrolytic ester cleavage is carried out at from 150° to 250° C. in the presence of organic sulfonic acids, in the absence of a solvent and in the virtual absence of free radical initiators.

2. A process as claimed in claim 1, wherein the polymers are pyrolyzed in the course of from 0.5 to 5 minutes at from 180° to 220° C.

3. A process as claimed in claim 1, wherein the pyrolysis is carried out in an extruder.

4. A process as claimed in claim 1, wherein copolymers which are composed of
   a) from 90 to 99.9 mol% of ethylene,
   b) from 0.1 to 10 mol% of $C_4$–$C_8$-tert-alkyl esters of copolymerizable $C_3$–$C_{12}$-carboxylic acids and
   c) from 0 to 9.9 mol% of further copolymerizable monomers, are used.

* * * * *